United States Patent
Kostin et al.

(10) Patent No.: US 12,472,850 B2
(45) Date of Patent: Nov. 18, 2025

(54) ADJUSTMENT DEVICE FOR A VEHICLE SUBASSEMBLY HAVING AN ADJUSTMENT MECHANISM AND A SUPPORTING ELEMENT

(71) Applicant: BROSE FAHRZEUGTEILE SE & CO. KOMMANDITGESELLSCHAFT, COBURG, Coburg (DE)

(72) Inventors: Sergej Kostin, Coburg (DE); Ulf Hartmann, Neustadt bei Coburg (DE); Matthias Süss, Grossheirath (DE); Abdelrahman Ibrahim, Coburg (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 159 days.

(21) Appl. No.: 18/546,951

(22) PCT Filed: Jan. 11, 2022

(86) PCT No.: PCT/EP2022/050421
§ 371 (c)(1),
(2) Date: Aug. 17, 2023

(87) PCT Pub. No.: WO2022/174989
PCT Pub. Date: Aug. 25, 2022

(65) Prior Publication Data
US 2024/0131965 A1  Apr. 25, 2024
US 2024/0227632 A9  Jul. 11, 2024

(30) Foreign Application Priority Data
Feb. 18, 2021 (DE) ...................... 10 2021 201 566.2

(51) Int. Cl.
*B60N 2/06* (2006.01)
*F16H 25/20* (2006.01)

(52) U.S. Cl.
CPC ............. *B60N 2/067* (2013.01); *F16H 25/20* (2013.01); *F16H 2025/2053* (2013.01); *F16H 2025/2084* (2013.01)

(58) Field of Classification Search
CPC ............. F16H 25/00; F16H 2025/2053; F16H 2025/2084
See application file for complete search history.

(56) References Cited

U.S. PATENT DOCUMENTS 6,915,998 B2 * 7/2005 Borbe ................ B60N 2/02246
 296/65.15
8,226,063 B2 * 7/2012 Weber .................... B60N 2/067
 297/344.1

(Continued)

FOREIGN PATENT DOCUMENTS

DE 102006011718 A1 10/2006
DE 102007023329 A1 11/2008

(Continued)

OTHER PUBLICATIONS

ISA European Patent Office, International Search Report Issued in Application No. PCT/EP2022/050421, Mar. 28, 2022, WIPO, 4 pages.

*Primary Examiner* — Nkeisha Smith
(74) *Attorney, Agent, or Firm* — McCoy Russell LLP

(57) ABSTRACT

It is provided an adjustment device for a vehicle subassembly comprises a guide rail which extends along a longitudinal direction, an adjustment assembly which is guided on the guide rail so as to be displaceable along the longitudinal direction and which is assigned to the vehicle subassembly, a spindle which is arranged on the guide rail, and an adjustment mechanism which is operatively connected to the spindle, is arranged on the adjustment assembly and has a mechanism housing and is able to be driven so that the adjustment mechanism can be displaced, together with the (Continued)

adjustment assembly, along the longitudinal direction relative to the guide rail. On the adjustment assembly there is arranged at least one retaining element, which has an opening which is delimited by an edge and through which the spindle extends. The at least one retaining element supports the mechanism housing on the adjustment assembly in a floating manner in such a way that the mechanism housing, together with the spindle, is movable with respect to the at least one retaining element with a bearing travel along a direction perpendicular to the longitudinal direction.

18 Claims, 12 Drawing Sheets

(56) References Cited

U.S. PATENT DOCUMENTS

| | | | |
|---|---|---|---|
| 8,511,194 B2* | 8/2013 | Angerer | F16H 1/16 74/425.5 |
| 9,180,795 B2* | 11/2015 | Flieger | B60N 2/067 |
| 9,815,389 B2* | 11/2017 | Elsarelli | B60N 2/0722 |
| 10,486,554 B2* | 11/2019 | Napau | B60N 2/06 |
| 12,043,142 B2* | 7/2024 | Zhao | B60N 2/067 |
| 2003/0173809 A1 | 9/2003 | Moradell et al. | |
| 2010/0320352 A1* | 12/2010 | Weber | F16H 25/20 74/89.23 |
| 2011/0174100 A1 | 7/2011 | Fukano et al. | |
| 2011/0284718 A1 | 11/2011 | Kimura et al. | |
| 2015/0210187 A1* | 7/2015 | Harleb | B60N 2/067 248/429 |
| 2015/0367752 A1* | 12/2015 | Chang | F16H 25/2003 74/89.42 |
| 2017/0009870 A1* | 1/2017 | Hoffmann | F16H 57/039 |

FOREIGN PATENT DOCUMENTS

| | | |
|---|---|---|
| DE | 102011008879 A1 | 7/2011 |
| DE | 102011108982 A1 | 2/2013 |

* cited by examiner

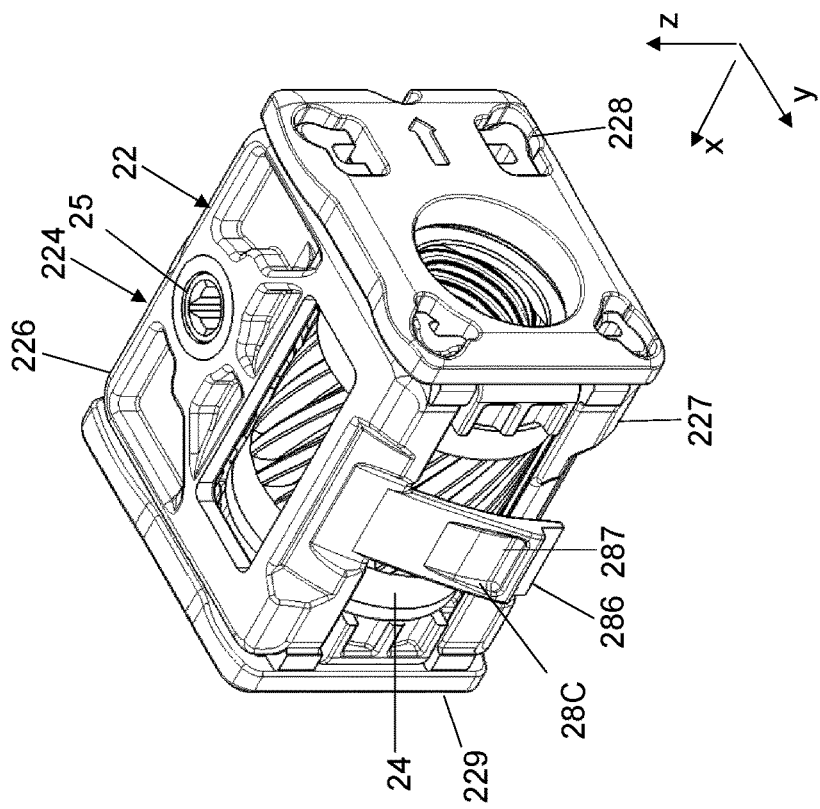
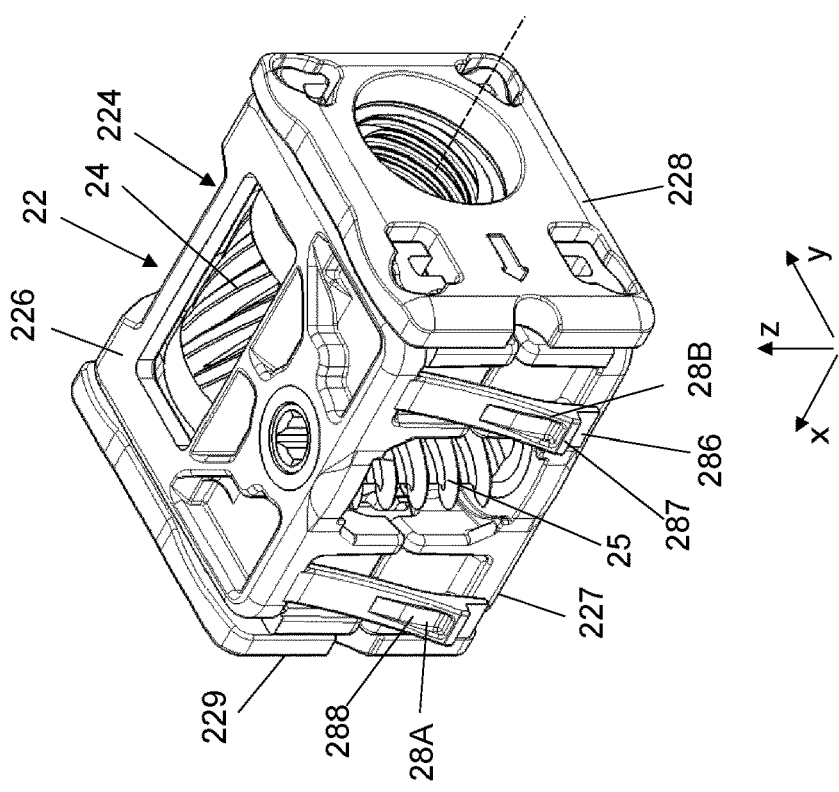

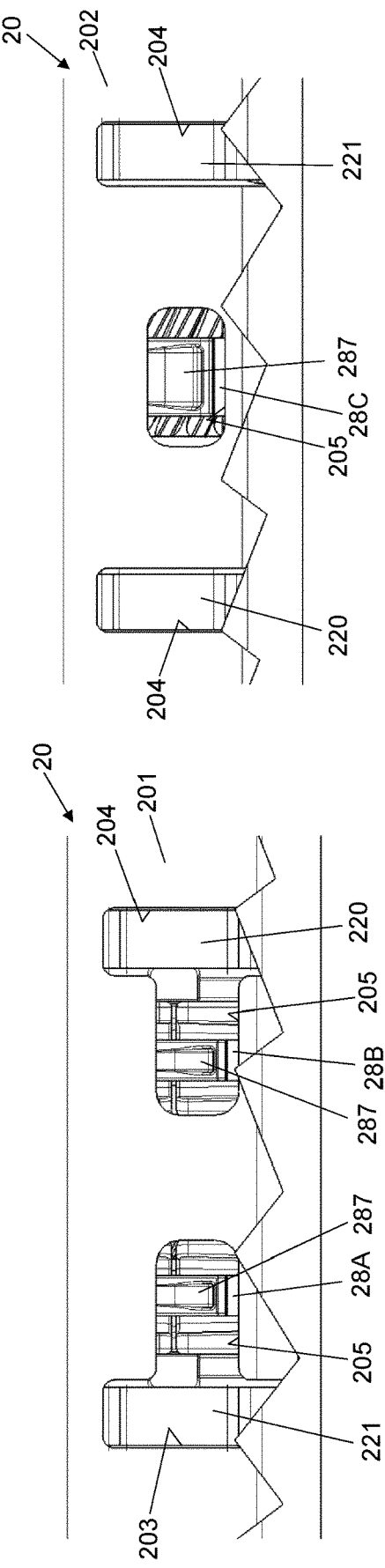

ADJUSTMENT DEVICE FOR A VEHICLE SUBASSEMBLY HAVING AN ADJUSTMENT MECHANISM AND A SUPPORTING ELEMENT

CROSS REFERENCE TO RELATED APPLICATIONS

The present application is a U.S. National Phase of International Application No. PCT/EP2022/050421 entitled "ADJUSTMENT DEVICE FOR A VEHICLE SUBASSEMBLY HAVING AN ADJUSTMENT MECHANISM AND A SUPPORTING ELEMENT" and filed on Jan. 11, 2022. International Application No. PCT/EP2022/050421 claims priority to German Patent Application No. 10 2021 201 566.2 filed on Feb. 18, 2021. The entire contents of each of the above-listed applications are hereby incorporated by reference for all purposes.

BACKGROUND

The disclosure relates to an adjustment device for a vehicle subassembly.

Such an adjustment device comprises a guide rail which extends along a longitudinal direction, an adjustment assembly which is guided on the guide rail so as to be displaceable along the longitudinal direction and which is assigned to the vehicle subassembly, a spindle which is arranged on the guide rail, an adjustment mechanism which is operatively connected to the spindle and is arranged on the adjustment assembly, and at least one retaining element arranged on the adjustment assembly. The adjustment mechanism has a mechanism housing and is able to be driven so that the adjustment mechanism can be displaced together with the adjustment assembly, along the longitudinal direction relative to the guide rail. The at least one retaining element has an opening which is delimited by an edge and through which the spindle extends.

Such a vehicle subassembly may be formed in particular by a vehicle seat which can be adjusted longitudinally, for example on a vehicle floor, by adjusting the adjustment assembly on the guide rail.

The adjustment movement of the adjustment assembly in relation to the guide rail is effected by a spindle gear. For this purpose, a spindle is arranged on the guide rail and is operatively connected to an adjustment mechanism in such a way that the adjustment mechanism and, together with the adjustment mechanism, the adjustment assembly is movable with respect to the guide rail by being driven. The adjustment mechanism has, for example, a spindle nut which is enclosed in the mechanism housing and which is in threaded engagement with the spindle in such a way that, when turned, the spindle nut rolls on the spindle and is thereby adjusted longitudinally along the longitudinal direction on the spindle. The adjustment mechanism is arranged on the adjustment assembly via the mechanism housing by being supported on the at least one retaining element in such a way that, when the adjustment mechanism is adjusted, the adjustment assembly is moved together with the adjustment mechanism and thus displaced with respect to the guide rail.

An adjustment device of this type is known, for example, from DE 10 2007 023 329 A1.

In new vehicle seat concepts, it may be provided to allow a vehicle subassembly, for example a vehicle seat or a console element in a vehicle interior, to be adjusted over a relatively large adjustment path. For example, it can be provided to move a vehicle seat between a front position and a rear position over a large adjustment travel in a vehicle interior, wherein, for this purpose, the guide rail guiding the adjustment assembly and for example arranged on the vehicle floor is configured to be long, for example longer than 1 m, for example even longer than 1.5 m.

This is accompanied by the fact that in future concepts the spindle, which is arranged non-rotatably on the guide rail, may also extend over a long distance. This can result in the spindle not extending in a completely straight line along the guide rail, but being bent, for example, by a certain distance due to the effect of gravity. In addition, tolerances in the straightness and position of the spindle can occur.

During normal operation of an adjustment device, it must be prevented that the spindle comes into contact with the edge delimiting the opening in the at least one retaining element. Such contact would increase friction in the system and may also be accompanied by noise. To counteract contact, it can be provided to enlarge the opening. However, in exceptional circumstances, in particular in the event of a collision, the spindle may be intended to come into operative contact with the at least one retaining element as a result of the spindle catching on the edge of the opening in the event of deformation on the at least one retaining element, in order to provide additional support in the event of a collision. If the opening in the at least one retaining element, configured for example as a retaining bracket enclosing the mechanism housing at least in portions, is thus enlarged, this may be accompanied by a reduced strength of the adjustment device in the event of a collision. This must be avoided.

SUMMARY

The object underlying the proposed solution is to provide an adjustment device for a vehicle subassembly, in particular for a vehicle seat or a console element in the vehicle interior, which adjustment device, with a collision-resistant design, enables advantageous adjustment operation with low noise development.

This object is achieved by a device having features as described herein.

Accordingly, in the adjustment device, it is provided that the at least one retaining element supports the mechanism housing on the adjustment assembly in a floating manner in such a way that the mechanism housing, together with the spindle, is movable with respect to the at least one retaining element with a bearing travel along a direction perpendicular to the longitudinal direction. The adjustment device comprises a supporting element which is configured to limit the bearing travel of the mechanism housing along the direction perpendicular to the longitudinal direction in such a way that the spindle is prevented from butting against the edge of the opening of the at least one retaining element along the direction perpendicular to the longitudinal direction.

The mechanism housing is thus mounted in a floating manner on the at least one retaining element and is thus movable with respect to the at least one retaining element along a direction perpendicular to the longitudinal direction, for example corresponding to the vehicle vertical direction. The at least one retaining element creates an axial support for the mechanism housing along the longitudinal direction, so that, when the adjustment mechanism is driven, the adjustment assembly is adjusted axially along the longitudinal direction, together with the adjustment mechanism, by introduction of force via the mechanism housing. Perpendicular to the longitudinal direction, however, the mechanism housing can move with respect to the at least one retaining element, so that the mechanism housing can in particular perform a compensating movement with respect to the at least one retaining element in order to compensate for tolerances, for example in the adjustment mechanism or in the shape or arrangement of the spindle.

However, in order to prevent a movement of the mechanism housing and an associated movement of the spindle with respect to the at least one retaining element from causing the spindle to come into contact with the edge delimiting the opening in normal operation, a supporting element is provided that provides support for the mechanism housing in normal operation in order to limit a bearing travel in the floating bearing of the mechanism housing along the direction perpendicular to the longitudinal direction. By limiting the bearing travel, the mechanism housing can be moved along the direction perpendicular to the longitudinal direction in normal operation, in particular only to such an extent with respect to the at least one retaining element that the spindle cannot come into contact with the edge limiting the opening of the at least one retaining element. In normal operation, contact between the spindle and the at least one retaining element is thus prevented, which enables low-friction and also acoustically advantageous operation of the adjustment device.

The limitation of the bearing travel can be, in particular, in a (single) direction perpendicular to the longitudinal direction. For example, a movement of the mechanism housing vertically downwards (i.e. along the vertical direction of the vehicle) can be limited by the supporting element, so that the spindle cannot come into contact with the edge of the opening vertically downwards. In other directions, contact of the spindle with the edge of the opening can be prevented in other ways, possibly by an additional supporting element. If necessary, contact can also occur realistically only in the direction of gravity and therefore does not have to be prevented in other spatial directions.

The supporting element can create a limitation of the bearing travel of the mechanism housing in different ways.

For example, in one embodiment, the supporting element can support the mechanism housing relative to the adjustment assembly.

For this purpose, the supporting element can, for example, be arranged on the adjustment assembly, for example as a result of the supporting element being supported on the at least one retaining element or on the adjustment assembly, for example on rail legs of an adjustment rail forming the adjustment assembly. For example, the supporting element can be supported form-fittingly, for example in that the supporting element engages in one or more support openings on the retaining element or on one or both rail legs of the adjustment rail and is thus fixed form-fittingly along the direction perpendicular to the longitudinal direction with respect to the retaining element and/or to the rail legs.

In this embodiment, the supporting element is thus fixedly arranged on the adjustment assembly, for example on rail legs of an adjustment rail, and has a clearance with respect to the mechanism housing of the adjustment mechanism, so that the adjustment mechanism is mounted in a floating manner. However, a bearing travel of the mechanism housing is limited here by the supporting element fixed to the adjustment assembly along the direction perpendicular to the longitudinal direction.

In another embodiment, the supporting element is arranged on the mechanism housing. The supporting element can be formed here in one piece with a housing part of the mechanism housing, for example as a tab which extends from the housing part. The housing part can, for example, be formed from plastic by means of plastics injection molding.

The supporting element is, for example, injection molded with the housing part. The supporting element provides support for the mechanism housing relative to the adjustment assembly, in that the supporting element interacts with the adjustment assembly, for example with rail legs of an adjustment rail of the adjustment assembly. However, the supporting element has a clearance with respect to the adjustment assembly, so that the mechanism housing is mounted in a floating manner with respect to the adjustment assembly, but a bearing travel of the mechanism housing along the direction perpendicular to the longitudinal direction is limited.

The supporting element can, for example, be configured as an elastically resilient element and, for this purpose, can be elastically resilient at least in portions. For example, the supporting element can be formed by a wire spring or a leaf spring or, alternatively, by a clip element or a plastics molding which is to be latched.

In one embodiment, the supporting element can be detachably mounted on the adjustment assembly. In particular, the supporting element can be fixed to the adjustment assembly after mounting the adjustment mechanism in order to support the adjustment mechanism relative to the adjustment assembly, wherein the supporting element can also be removed again, if necessary, for example in order to dismantle the adjustment mechanism.

In another embodiment, the supporting element is configured to support the mechanism housing relative to the guide rail. In this case, the supporting element is arranged, for example fixedly arranged, on the mechanism housing for example, so that the supporting element supports the mechanism housing on the guide rail.

The supporting element can be formed here for example in one piece with the mechanism housing, for example by plastics injection molding.

The supporting element can, for example, be in the form of a lug, a rib or even a rollingly mounted roller.

In one embodiment, the supporting element protrudes from the mechanism housing along the direction perpendicular to the longitudinal direction.

Alternatively, it is also possible to arrange the supporting element on the guide rail, for example on a base of the guide rail. In this case, the supporting element can, for example, have the form of a projection which extends along the longitudinal direction, onto which the adjustment mechanism with the mechanism housing can run for support.

Regardless of the specific design, the supporting element may be configured to provide support over an entire range of adjustment of the adjustment assembly relative to the guide rail during normal operation. In another embodiment, the supporting element can be configured to provide support only over a portion of the adjustment path.

A supporting effect of the supporting element can also be dependent here on tolerances, an effect of gravity or a state of wear. Thus, it can be provided that the supporting element only has a supporting effect if, for example due to existing tolerances, the spindle approaches the edge of the opening on the at least one retaining element (inadmissibly) when the mechanism housing is adjusted within the scope of the floating bearing, but does not have a supporting effect and thus also does not contribute to friction if there is no (excessive) approach during normal operation.

In one embodiment, the adjustment assembly is formed by an adjustment rail which has a base and two rail legs arranged on the base. The adjustment assembly is thus configured as a rail guided longitudinally along the longitudinal direction on the guide rail, on which rail the vehicle subassembly is fixed, for example in the form of a vehicle seat or in the form of a console element. In this case, the adjustment mechanism can be accommodated with the mechanism housing between the rail legs and can be supported via the at least one retaining element with respect to the adjustment rail in such a way that, when the adjustment mechanism is driven, the adjustment rail is moved together with the adjustment mechanism along the longitudinal direction with respect to the spindle and thus with respect to the guide rail.

In one embodiment, the supporting element is arranged here on at least one of the rail legs and thereby fixed to the adjustment rail, for example by the supporting element being form-fittingly fixed to one or both of the rail legs along the direction perpendicular to the longitudinal direction. The supporting element fixed to the adjustment rail creates a support for the mechanism housing to limit the bearing travel along the direction perpendicular to the longitudinal direction, so that the mechanism housing is indeed mounted in a floating manner with respect to the adjustment rail, but a bearing travel of the mechanism housing along the direction perpendicular to the longitudinal direction is limited.

In another embodiment, the supporting element is arranged on the mechanism housing and is configured to provide support for the mechanism housing on at least one of the rail legs to limit the bearing travel along the direction perpendicular to the longitudinal direction. Again, the mechanism housing is supported in a floating manner on the adjustment rail, wherein a bearing travel of the mechanism housing along the direction perpendicular to the longitudinal direction is limited by interaction of the supporting element arranged on the mechanism housing with at least one of the rail legs of the adjustment rail. For example, the supporting element can be formed as a tab on a housing part of the mechanism housing.

Such a supporting element may, for example, have an engagement protrusion that engages in a support opening on at least one of the rail legs. The engagement protrusion is located with play in the support opening so that the mechanism housing can be moved in a floating manner between the rail legs of the adjustment rail along the direction perpendicular to the longitudinal direction, but a bearing travel of the mechanism housing is limited along the direction perpendicular to the longitudinal direction by the engagement of the engagement protrusion in the assigned support opening on the rail leg.

The supporting element can be arranged unilaterally on one side of the mechanism housing. In another embodiment, supporting elements are arranged on opposite sides of the mechanism housing, facing one of the rail legs each. The supporting elements thus provide support on both sides of the mechanism housing with respect to both rail legs of the adjustment rail, wherein each supporting element can, for example, have an engagement protrusion which engages in an assigned support opening on the assigned rail leg. Here, the engagement protrusion engages with play in the assigned support opening, so that the mechanism housing is mounted in a floating manner between the rail legs, but a bearing travel along the direction perpendicular to the longitudinal direction is limited.

In one embodiment, the at least one retaining element is arranged fixedly between the rail legs. The at least one retaining element is thus fixed to the adjustment assembly and for this purpose is fixedly connected to one or both of the rail legs, so that the at least one retaining element supports the adjustment mechanism axially along the longitudinal direction with respect to the adjustment assembly. The direction perpendicular to the longitudinal direction, along which the mechanism housing is movable with respect to the at least one retaining element within the scope of the floating bearing, can in this case be directed perpendicular to the base, corresponding in particular to a vehicle vertical direction, which corresponds (substantially) to the direction of gravity in a level position of the vehicle.

In one embodiment, the at least one retaining element forms a flat plate portion which extends transversely to the longitudinal direction. For example, two retaining elements can be provided which extend with plate portions transverse to the longitudinal direction and receive between them the mechanism housing in such a way that the mechanism housing is supported axially on both sides along the longitudinal direction with respect to the adjustment assembly via the retaining elements and thus a movement of the adjustment mechanism along the longitudinal direction leads to a driving of the adjustment assembly for movement along the guide rail.

The at least one retaining element can be arranged here on the adjustment assembly in such a way, for example, that the mechanism housing can be mounted on the at least one retaining element along the direction perpendicular to the longitudinal direction if the retaining element is already mounted on the adjustment assembly. The at least one retaining element supports the mechanism housing axially along the longitudinal direction with respect to the adjustment assembly, but for example not along the direction perpendicular to the longitudinal direction. This enables easy assembly of the mechanism housing, wherein support is created in operation via the (additional) supporting element, which prevents the spindle from coming into contact with the edge of the opening on the retaining element during normal operation.

BRIEF DESCRIPTION OF THE DRAWINGS

The concept underlying the solution will be explained in greater detail below with reference to the exemplary embodiments shown in the figures.

FIGS. 11A-11C show views of another exemplary embodiment of an adjustment mechanism, with supporting elements arranged on a mechanism housing.

FIGS. 14A, 14B show views of the supporting elements in engagement with assigned support openings on the rail legs of the adjustment rail.

DETAILED DESCRIPTION

Figure 1:
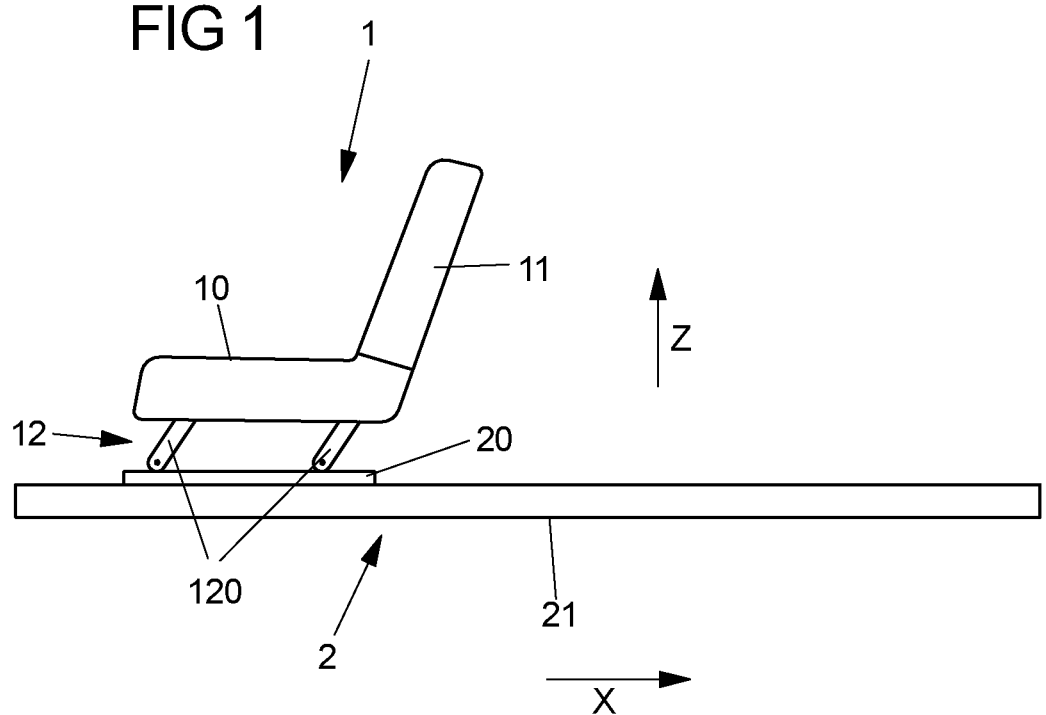
FIG. 1 shows a schematic view of a vehicle subassembly in the form of a vehicle seat that is longitudinally adjustable via an adjustment device.

FIG. 1 shows a schematic view of a vehicle subassembly in the form of a vehicle seat 1, which has a seat part 10 and a backrest part 11, the inclination of which can be adjusted at the seat part 10.

The vehicle subassembly in the form of the vehicle seat 1 is connected via a height adjustment device 12 to an adjustment device 2 for longitudinal adjustment of the vehicle seat 1 along a longitudinal direction X. For this purpose, the vehicle seat 1 is connected to two guide rail pairs via kinematic parts 120 in the form of so-called rockers of the height adjustment device 12 and is thereby mounted so as to be displaceable along the longitudinal direction X.

Figure 2:
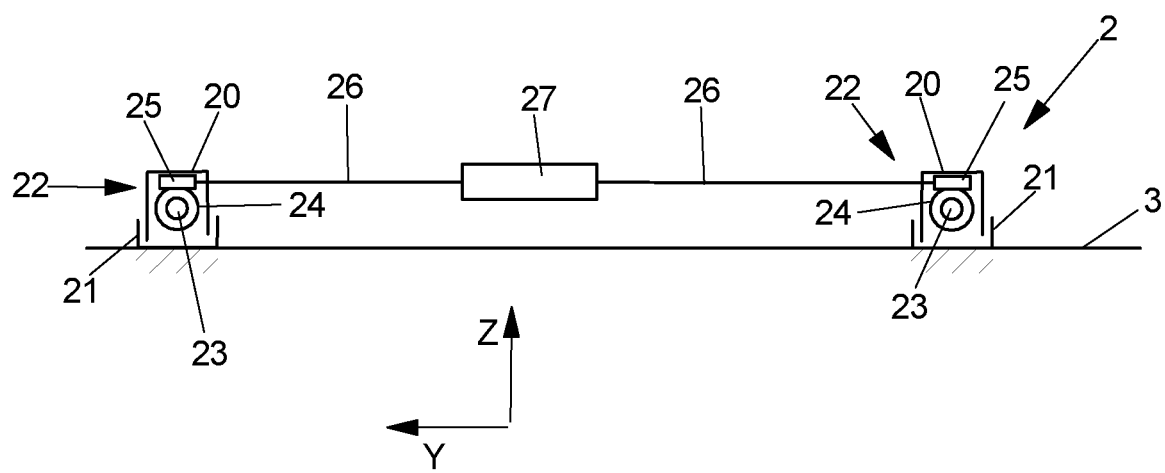
FIG. 2 shows a schematic view of the adjustment device, comprising two guide rail pairs for longitudinal adjustment of the vehicle subassembly.

As can be seen from the schematic view according to FIG. 2, the adjustment device 2 in the illustrated exemplary embodiment has two guide rail pairs, which are each formed by an upper adjustment rail 20 and a lower guide rail 21. The adjustment rail 20 forming an adjustment assembly is coupled to the vehicle seat 1 via the height adjustment device 12 in such a way that the vehicle seat 1 can be moved along the longitudinal direction X by adjusting the adjustment rail 20 longitudinally. The lower guide rails 21 are fixed, for example, to a floor assembly 3, for example a vehicle floor, so that the vehicle seat 1 can be moved with respect to the floor assembly 3 via the lower guide rails 21.

Each pair of guide rails has assigned to it, in the exemplary embodiment according to FIG. 2, an adjustment mechanism 22 which has a spindle nut 24 arranged on a spindle 23, which spindle nut 24 is in threaded engagement with the spindle 23 and, when rotated, rolls on the spindle 23 in such a way that the spindle nut 24 is moved longitudinally along the longitudinal direction X with respect to the spindle 23. A drive element 25, for example in the form of a drive worm, is in toothed engagement with the spindle nut 24 so that an adjustment force can be introduced into each spindle nut 24 via an assigned drive shaft 26 and a drive motor 27, and thus the adjustment mechanisms 22 of the guide rail pairs can be driven.

Figure 3:
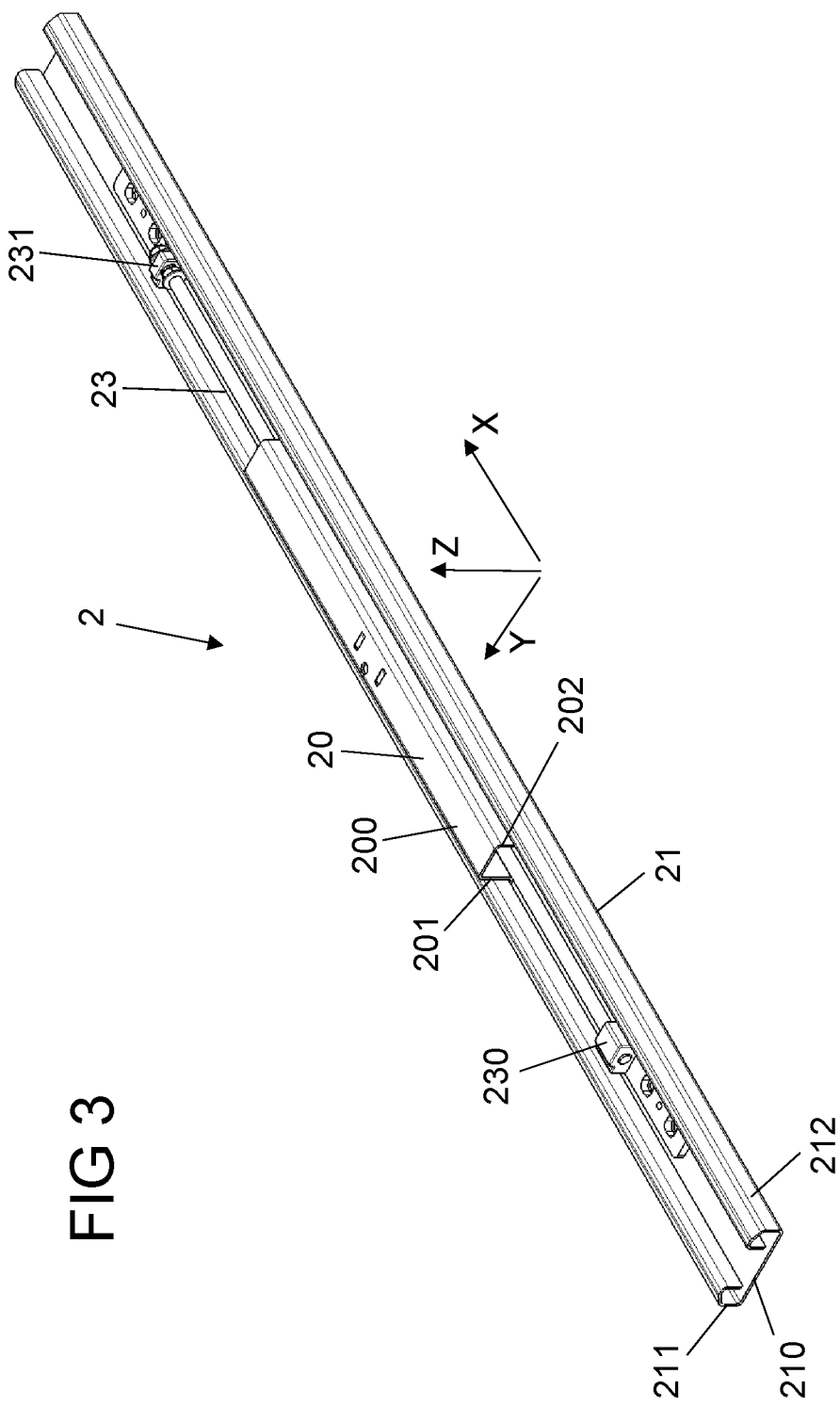
FIG. 3 shows a view of an adjustment assembly on an associated guide rail.

An exemplary embodiment of a guide rail pair is shown in FIG. 3. In the exemplary embodiment shown, the lower guide rail 21 is comparatively long, for example longer than 1 m, for example longer than 1.5 m, in order to enable adjustment of the vehicle seat 1 over a comparatively large adjustment range in a vehicle interior. The adjustment rail 20 is guided longitudinally along the longitudinal direction X on the guide rail 21, wherein, for this purpose, rail legs 201, 202 of the adjustment rail 20 arranged on a base 200 are received between legs 211, 212 of the guide rail 21 arranged on a base 210.

In the exemplary embodiment shown, a spindle 23 is fixed non-rotatably on the base 210 of the guide rail 21 via fastening elements 230, 231 in the form of so-called spindle retaining brackets. An adjustment mechanism associated with the adjustment rail 20 is operatively connected to the fixed spindle 23 in such a way that the adjustment rail 20 can be moved longitudinally along the longitudinal direction X with respect to the guide rail 21 by driving of the adjustment mechanism 22.

Figure 4:
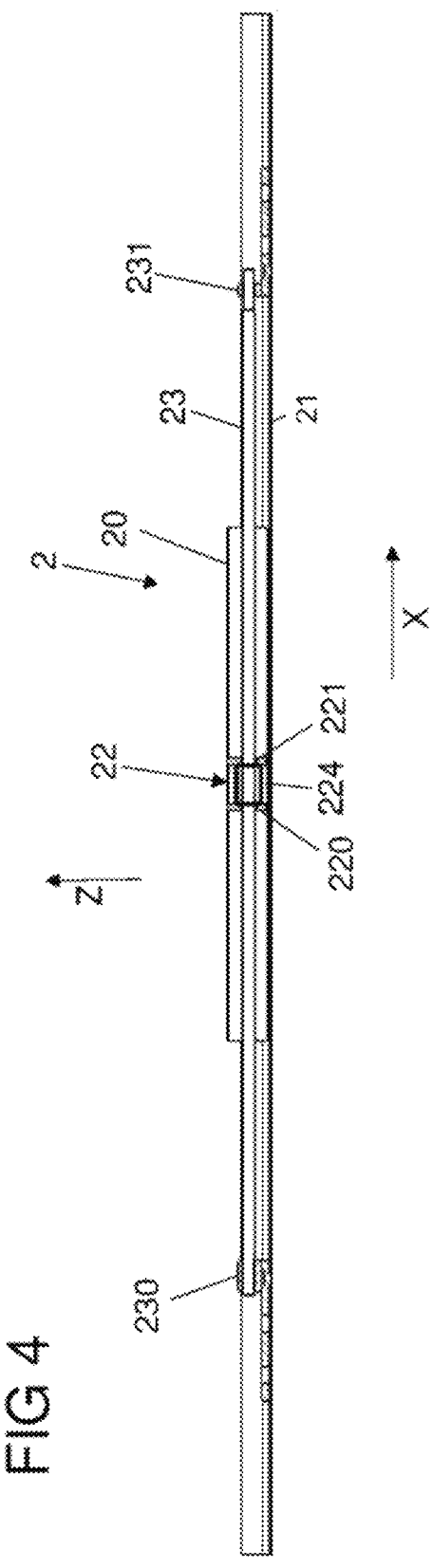
FIG. 4 shows a longitudinal sectional view of the arrangement according to FIG. 3.
Figure 5:
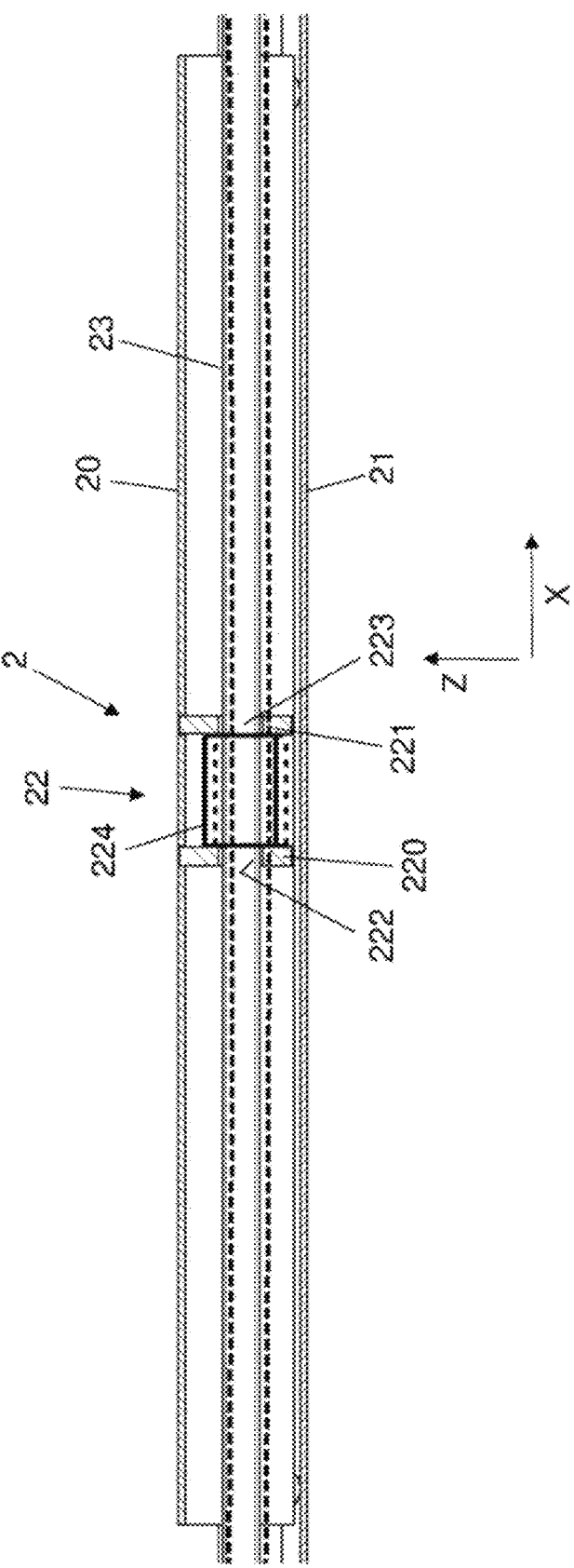
FIG. 5 shows an enlarged detail of the view according to FIG. 4.

As can be seen from the longitudinal sectional views according to FIGS. 4 and 5, the adjustment mechanism 22 has a mechanism housing 224 which is accommodated between retaining elements 220, 221 which are fixedly connected to the adjustment rail 20. The retaining elements 220, 221 provide axial support for the adjustment mechanism 22 relative to the adjustment rail 20, in such a way that, when the adjustment mechanism 22 is driven and a longitudinal movement of the adjustment mechanism 22 on the spindle 23 is thereby effected, the adjustment rail 20 is moved together with the adjustment mechanism 22 along the longitudinal direction X and is thus adjusted for longitudinal adjustment of the vehicle seat 1.

As can be seen from the longitudinal sectional views according to FIGS. 4 and 5, the spindle 23 extends through openings 222, 223 in the plate-like retaining elements 220, 221 and is operatively connected to the adjustment mechanism 22 between the retaining elements 220, 221.

In order to allow an adjustment of the vehicle seat 1 over a relatively large adjustment range, corresponding to the long design of the guide rail 21, the spindle 23 is also relatively long, as can be seen in FIG. 4. As a result, due to tolerances in the positioning or the straightness of the spindle 23 or also due to an effect of gravity, the position of the spindle 23 can change during an adjustment movement relative to the retaining elements 220, 221, so that the spindle 23 can, if necessary, approach an edge of the retaining elements 220, 221 delimiting the openings 222, 223 respectively, as is shown for the spindle 23 by way of dashed lines in FIG. 5. If the spindle 23 comes into contact with the retaining elements 220, 221 during operation, this can lead to undesired friction and also to noise generation.

To counteract this, it can be provided to enlarge the openings 222, 223 in the retaining elements 220, 221. However, it should be noted that, for example, in the event of a collision, large collision forces that lead to a deformation of, for example, the retaining elements 220, 221 should cause the spindle 23 to engage with the retaining elements 220, 221 in order to create additional collision support in this way and thus prevent uncontrolled adjustment of the vehicle seat 1 in the event of a collision. The openings 222, 223 should therefore not be too large.

In the exemplary embodiment shown in FIGS. 4 and 5, the retaining elements 220, 221 are configured as plate-like elements, which support the mechanism housing 224 of the adjustment mechanism 22 axially along the longitudinal direction X, but at the same time support the mechanism housing 224 in a floating manner perpendicular to the longitudinal direction X, in particular along a vertical direction Z, so that the mechanism housing 224 can move along the vertical direction Z with respect to the retaining elements 220, 221 by a certain bearing travel. This allows a compensating movement of the adjustment mechanism 22 to compensate for tolerances, but at the same time favors an approaching of the spindle 23 towards the edges of the openings 222, 223 in the retaining elements 220, 221.

Figure 6:
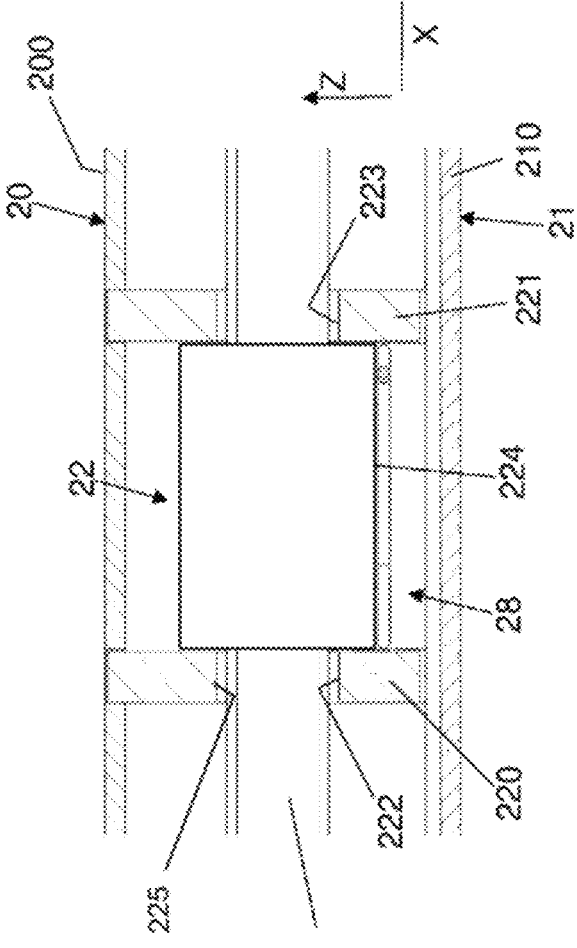
FIG. 6 shows a view of an exemplary embodiment with a supporting element supporting a mechanism housing.
Figure 7:
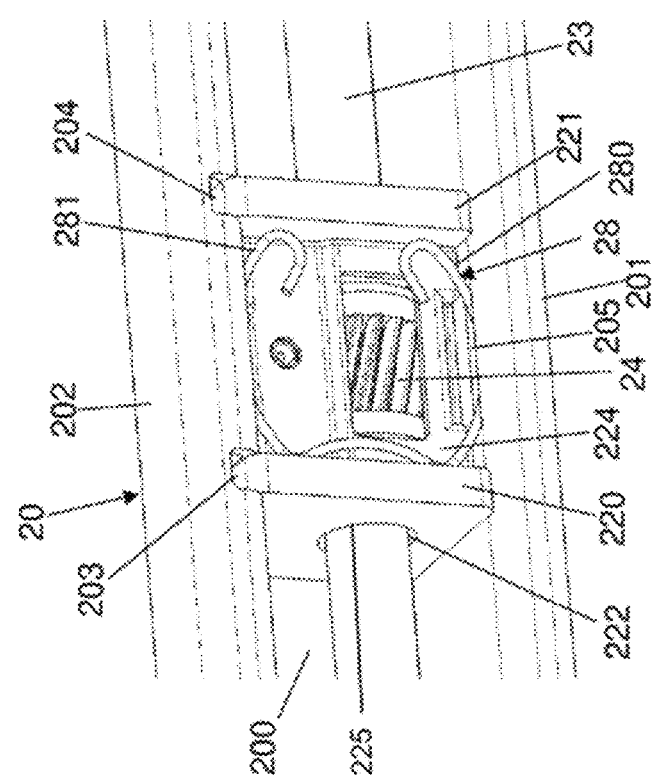
FIG. 7 shows a perspective view of the exemplary embodiment according to FIG. 6.
Figure 8:
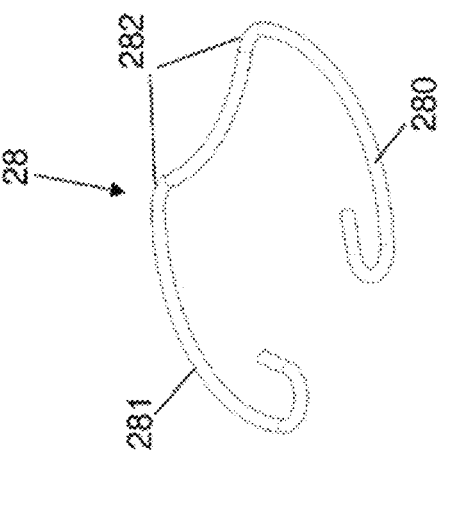
FIG. 8 shows a separate view of the supporting element.

In an exemplary embodiment shown in FIGS. 6 and 7, an additional supporting element 28 in the form of a spring element shown in a separate view in FIG. 8 is, for this reason, arranged between the retaining elements 220, 221 and limits a bearing travel of the mechanism housing 224 along the vertical direction Z. As can be seen in FIG. 6, the supporting element 28 is arranged on a lower side of the mechanism housing 224 facing the base 210 of the guide rail 21 and thereby supports the mechanism housing 224 downwards. Tolerances or a gravity-induced deflection at the spindle 23 (in the form of a sagging of the spindle 23) therefore cannot cause the spindle 23 to approach edges 225 of the openings 222, 223 in such a way that the spindle 23 comes into contact with the edges 225.

In particular, the supporting element 28 is placed between the retaining elements 220, 221 in such a way that a bearing travel Z1 of the mechanism housing 224 is limited in such a way that the mechanism housing 224 comes into contact with the supporting element 28 during normal operation before the spindle 23 can come into contact with the edges 225 of the openings 222, 223 of the retaining elements 220, 221 along the vertical direction Z.

As can be seen from FIG. 6 and FIG. 7, the retaining elements 220, 221 are plate-like and are supported form-fittingly in receiving openings 203, 204 on the leg 202 of the adjustment rail 20. In addition, the retaining elements 220, 221 can, for example, be fixedly connected to the base 200, for example by means of a welded connection.

As can also be seen from FIG. 7, the supporting element 28, which is configured as a spring element in the form of a bent wire spring, extends in a plane perpendicular to the vertical direction Z and is received via legs 280, 281 in slot openings 205 on the inner side of the legs 201, 202 of the adjustment rail 20, so that the supporting element 28 is thus fixed between the rail legs 201, 202 of the adjustment rail 20. The supporting element 28 is also supported on the retaining elements 220, 221 via contact portions 282 in the form of contact points and via the ends of the legs 280, 281 that lie away from the contact portions 282.

In the exemplary embodiment according to FIGS. 6 to 8, the mechanism housing 224 is thus supported relative to the retaining elements 220, 221 and thereby relative to the adjustment rail 20.

In this case, the adjustment mechanism 22 can be inserted from below for mounting between the retaining elements 220, 221 already arranged on the adjustment rail 20, wherein the supporting element 28 is mounted after insertion of the adjustment mechanism 22.

Due to its resilient design, the supporting element 28 can also be released again so that the adjustment mechanism 22 can be dismantled if necessary.

Figure 9:
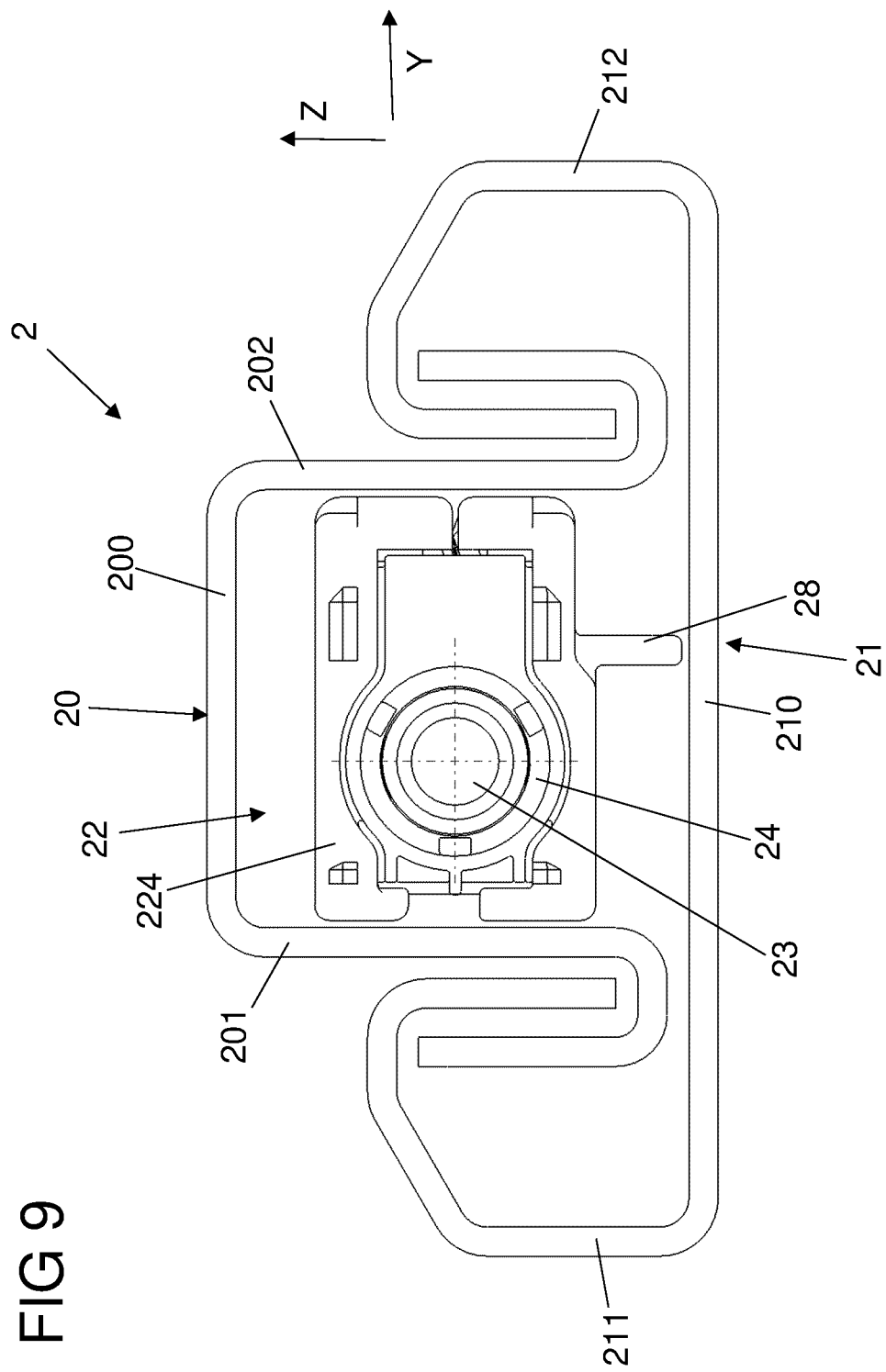
FIG. 9 shows a view of another exemplary embodiment with a supporting element for supporting the mechanism housing.

In an exemplary embodiment shown in FIG. 9, in comparison to the exemplary embodiment according to FIGS. 6 to 8, the supporting element 28 is arranged on the mechanism housing 224 and is formed in one piece with the mechanism housing 224, for example by plastics injection molding. In this case, the supporting element 28 protrudes from the mechanism housing 224 along the vertical direction Z in the form of a lug or a rib and extends starting from the mechanism housing 224 in the direction of the base 210 of the guide rail 21. The supporting element 28 thus provides support for the mechanism housing 224 on the base 210, so that an excessive approach of the mechanism housing 224 and thus of the spindle 23, which is operatively connected to the spindle nut 24 enclosed in the mechanism housing 224, towards the base 210 of the guide rail 21 is prevented.

This also prevents the spindle 23 from coming into contact with the edges 225 of the openings 222, 223 in the retaining elements 220, 221 during normal operation.

Apart from the design of the supporting element 28, the exemplary embodiment according to FIG. 9 is otherwise functionally identical to the exemplary embodiments described above, and therefore reference should also be made to the preceding explanations.

Figure 10:
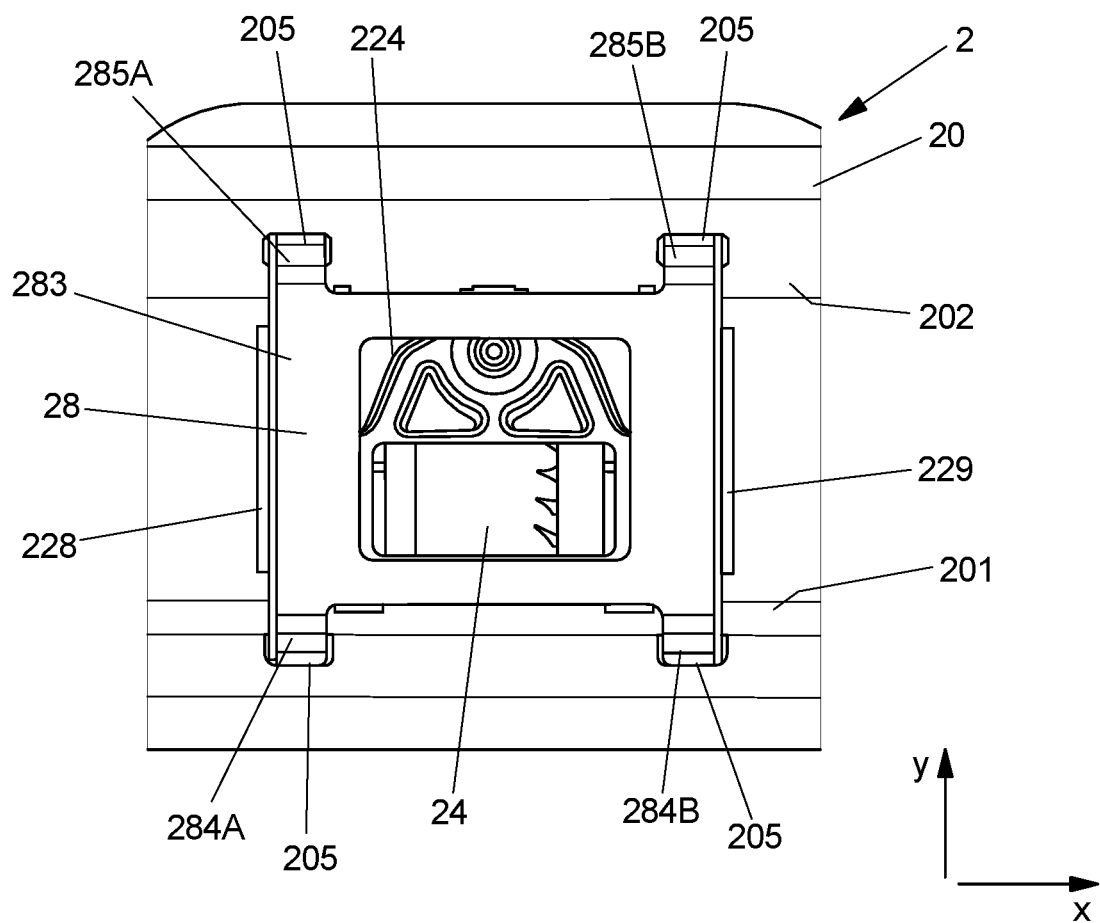
FIG. 10 shows a view of a further exemplary embodiment of an adjustment mechanism with a supporting element arranged between rail legs of an adjustment rail.

In another exemplary embodiment shown in FIG. 10, a supporting element 28 is arranged between rail legs 201, 202 of the adjustment rail 20. The supporting element 28 (viewed in FIG. 10 from below along the vertical direction Z into the adjustment rail 20) here has a plate-like basic form extending transversely to the vertical direction Z, with a base portion 283 which (viewed along the vertical direction Z) is arranged below the mechanism housing 224 of the adjustment mechanism 22 and thus provides support for the mechanism housing 224 downwards along the vertical direction Z. The supporting element 28 is arranged between the rail legs 201, 202 of the adjustment rail 20 and, for this purpose, engages with engagement protrusions 284A, 284B, 285A, 285B in an assigned support opening 205 on the rail legs 201, 202. The mechanism housing 224 has play in the space created between the rail legs 201, 202 and delimited along the vertical direction Z by the base 200 of the adjustment rail 20 on the one hand and by the supporting element 28 on the other hand, so that the adjustment mechanism 22 is mounted in a floating manner within the adjustment rail 20, but a bearing travel of the mechanism housing 224 is limited along the vertical direction Z by the supporting element 28.

Apart from the design of the supporting element 28, the exemplary embodiment according to FIG. 10 is otherwise functionally identical to the exemplary embodiments described above, and therefore reference should also be made to the explanations above.

Figure 11C:
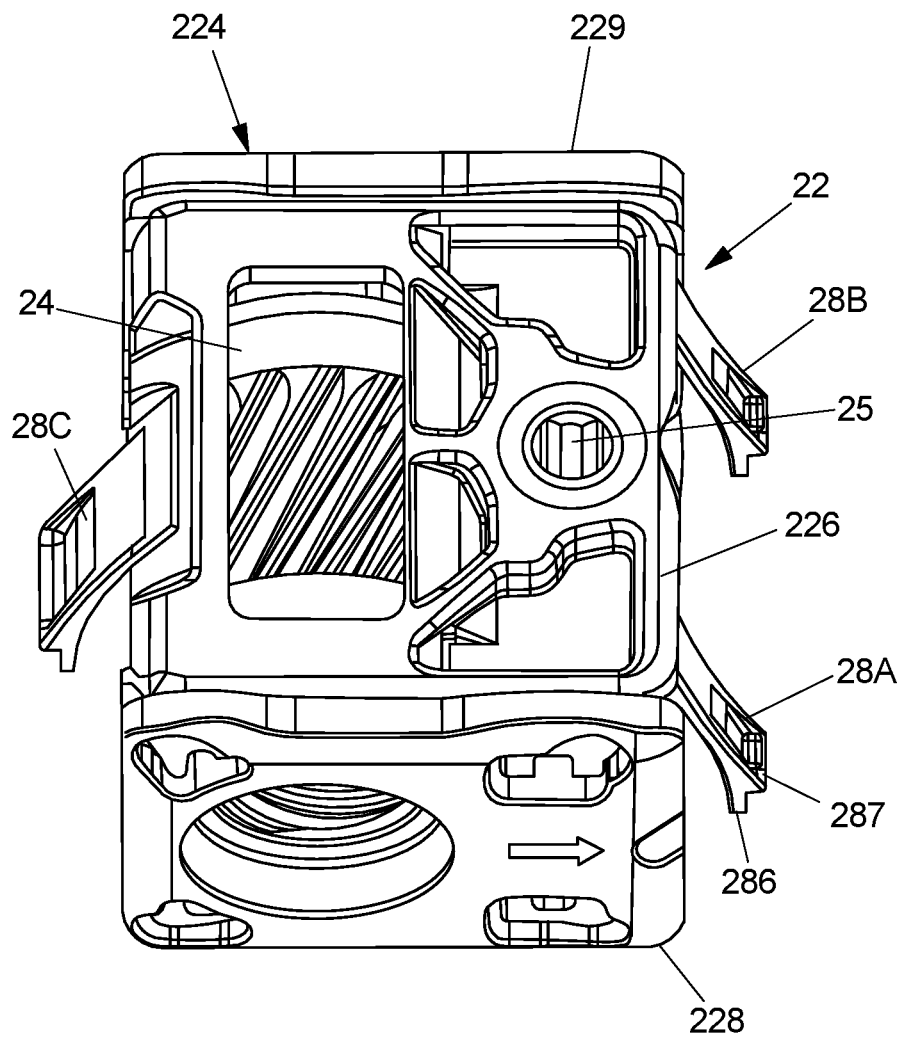

FIGS. 11A to 11C show an exemplary embodiment of an adjustment mechanism 22 comprising a mechanism housing 224 created by housing parts 226-229 with supporting elements 28A, 28B, 28C arranged thereon.

Housing parts 226, 227 here realize housing halves which are placed against each other along the vertical direction Z and between which the spindle nut 24 is enclosed and rotatably mounted. On the front side of the housing parts 226, 227, housing parts 228, 229 are arranged in the form of housing plates which connect the housing parts 226, 227 to each other.

In the illustrated exemplary embodiment, the supporting elements 28A, 28B, 28C are formed in one piece with the housing part 226 and protrude from the housing part 226 in the form of tabs. The supporting elements 28A, 28B, 28C are configured here as snap-action hooks and are injection-molded together with the housing part 226.

Figure 12B:
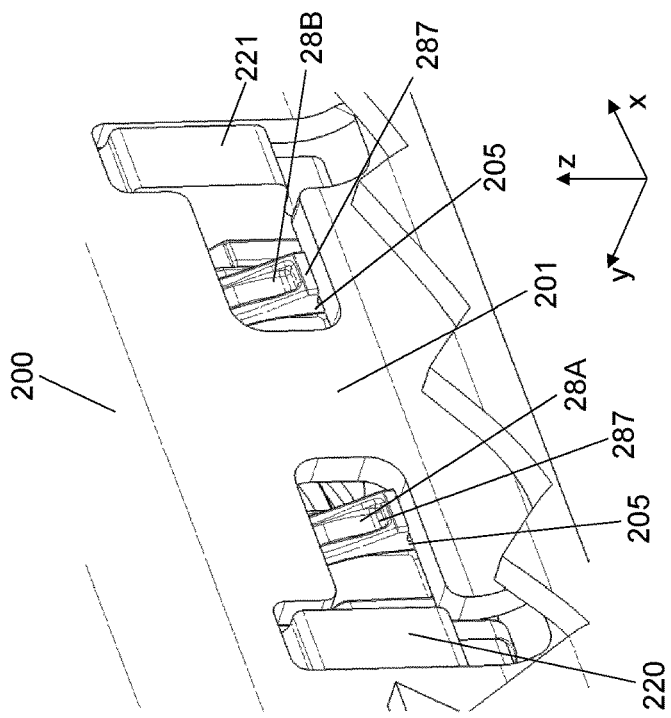
FIGS. 12A, 12B show views of the adjustment mechanism in a position mounted on an adjustment rail.
Figure 12A:
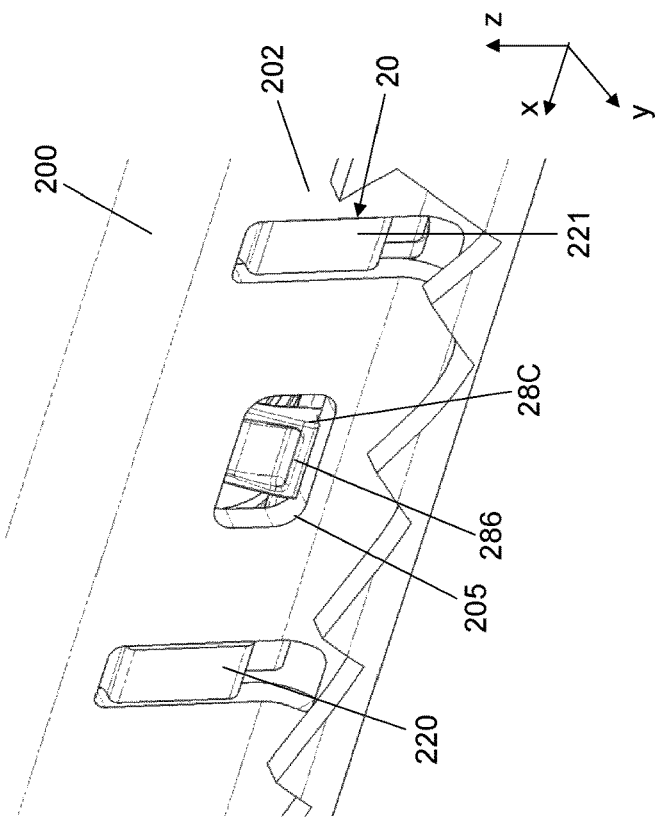

Each supporting element 28A, 28B, 28C has a free end 286 extending from the mechanism housing 224. In the region of the free end 286, an engagement protrusion 287 is formed in each case, which engages in an assigned support opening 205 on an assigned rail leg 201, 202 of the adjustment rail 20 for support, as can be seen in FIGS. 12A and 12B.

The supporting elements 28A, 28B, 28C each have a run-on bevel 288 on the engagement protrusion 287 on a side facing away from the end 286. The run-on bevels 288 on the supporting elements 28A, 28B, 28C allow the adjustment mechanism 22 to be inserted along the vertical direction Z from below between the rail legs 201, 202 of the adjustment rail 20, with the engagement protrusions 287 snapping into engagement with the assigned support openings 205 on the rail legs 201, 202.

In the assembled position, shown in FIGS. 12A, 12B and 14A, 14B, the supporting elements 28A, 28B, 28C engage with their engagement protrusions 287 with play in the assigned support opening 205. The adjustment mechanism 22 is thus mounted with its mechanism housing 224 in a floating manner along the vertical direction Z between the rail legs 201, 202, wherein a bearing travel along the vertical direction Z is limited by the engagement of the engagement protrusions 287 of the supporting elements 28A, 28B, 28C with play in the assigned support openings 205.

The limitation of the bearing travel is in particular such that the spindle 23 in threaded engagement with the spindle nut 24 (see FIGS. 1-6) cannot come into contact with the edges delimiting the openings 222, 223 in the retaining elements 220, 221, but a support is created along the vertical direction Z before contact is made.

Figure 13A:
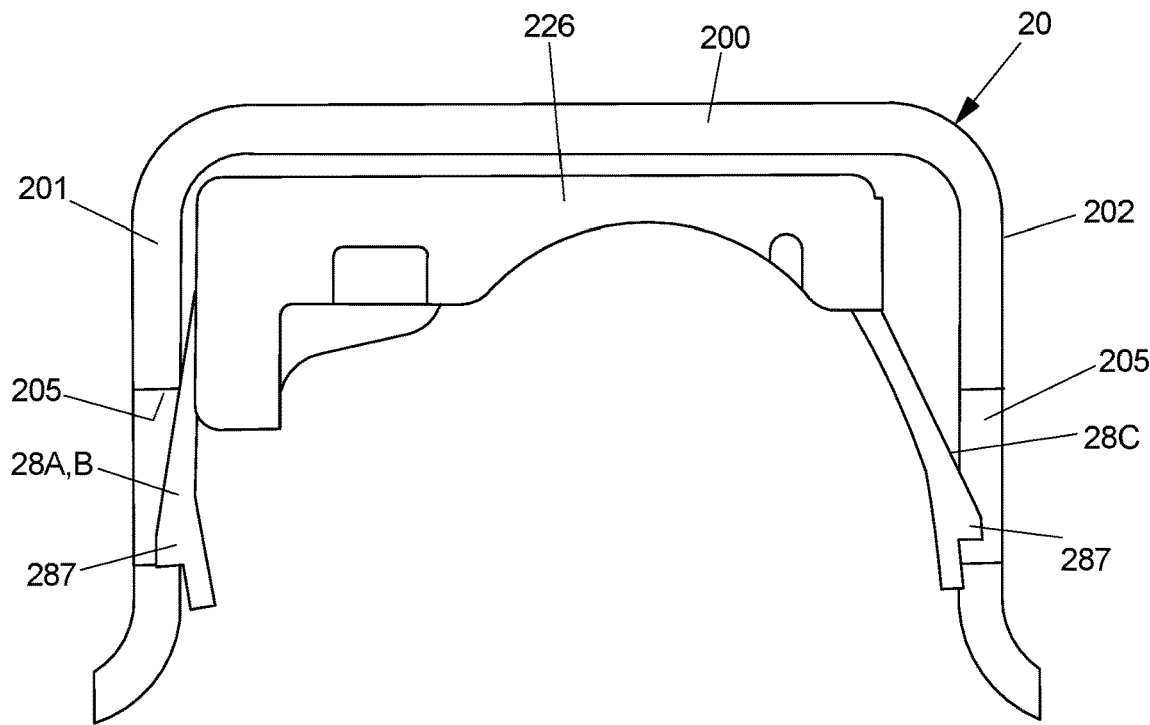
FIGS. 13A, 13BA show views of a housing part of a transmission housing of the adjustment mechanism during a transverse movement between the rail legs of the adjustment rail.
Figure 13B:
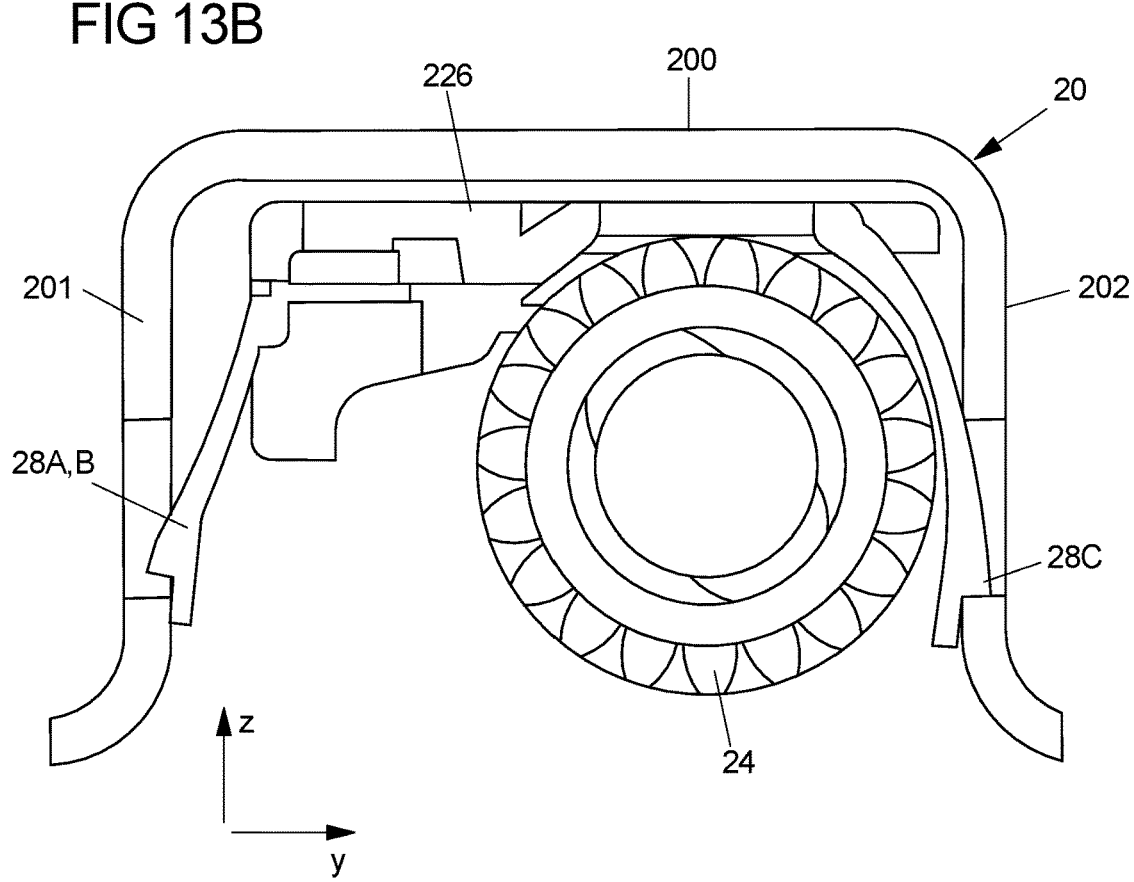

As can be seen in FIGS. 13A, 13B, the mechanism housing 224 can also be moved along the transverse direction Y directed transversely to the vertical direction Z and transversely to the longitudinal direction X between the rail legs 201, 202. The supporting elements 28A, 28B, 28C are configured here in such a way that, even in the event of a transverse movement of the mechanism housing 224, illustrated in FIGS. 13A, 13B by means of the housing part 226, the supporting elements 28A, 28B, 28C cannot interact with the spindle nut 24 enclosed in the mechanism housing 24.

In the exemplary embodiment shown, the supporting elements 28A, 28B, 28C are formed in one piece with the housing part 226 and can be deflected here elastically along the transverse direction Y, as can be seen in FIGS. 13A, 13B. However, along the vertical direction Z, the supporting elements 28A, 28B, 28C are flexurally rigid here, in such a way that a support of the mechanism housing 224 relative to the rail legs 201, 202 of the adjustment rail 20 can be created via the supporting elements 28A, 28B, 28C to limit the bearing travel along the vertical direction Z.

In a normal position (for example under a load not exceeding a control load), the supporting elements 28A, 28B, 28C with their engagement protrusions 287 are preferably not in contact with the edges delimiting the support openings 205 on the rail legs 201, 202, so that a forced position of the adjustment mechanism 22 is counteracted in a normal position and, in normal use, the adjustment mechanism 22 is movable in a floating manner on the adjustment rail 20 within the scope of its bearing play.

Figure 15:
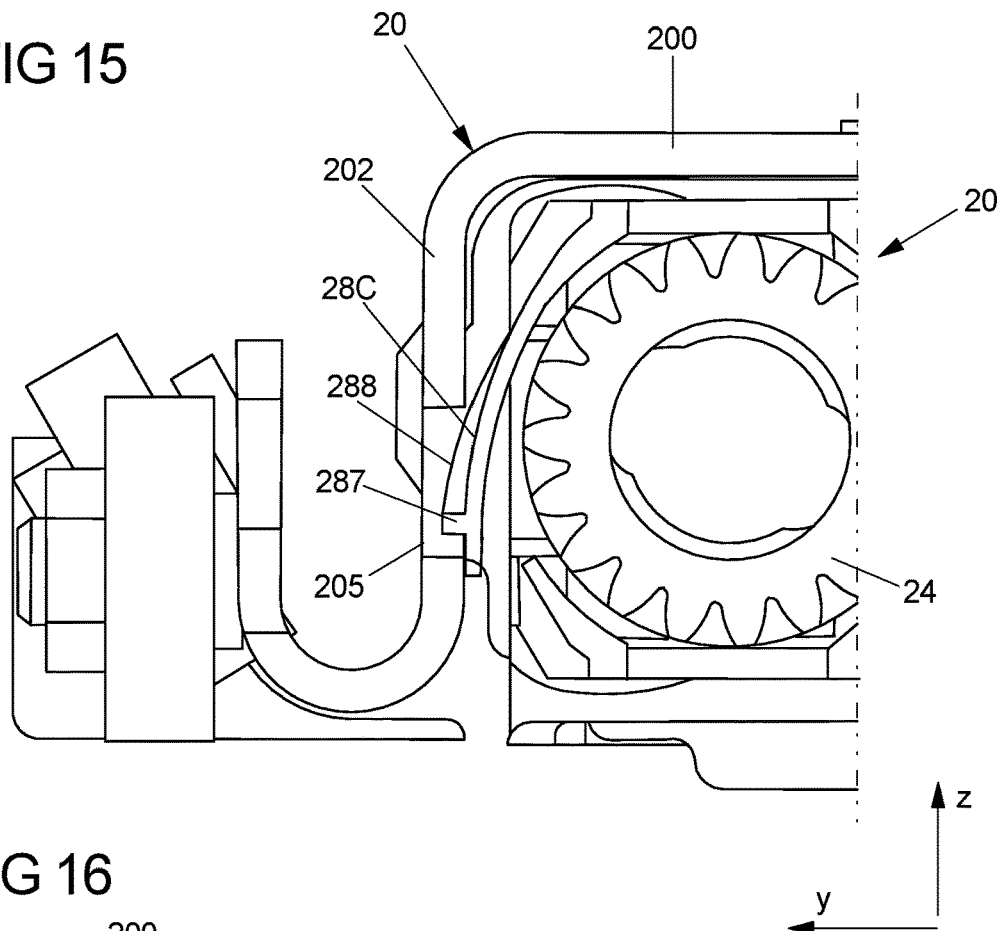
FIG. 15 shows a cross-sectional view of an exemplary embodiment of a supporting element.

The engagement protrusions 287 of the supporting elements 28A, 28B, 28C may be configured to provide downward support only in the vertical direction Z, as shown in FIG. 15. To this end, the engagement protrusions 287 can form a downward-facing contact surface extending transversely to the vertical direction Z, which can come into contact with a lower edge of the respective associated support opening 205 for support. An upward support is not created with this embodiment.

Figure 16:
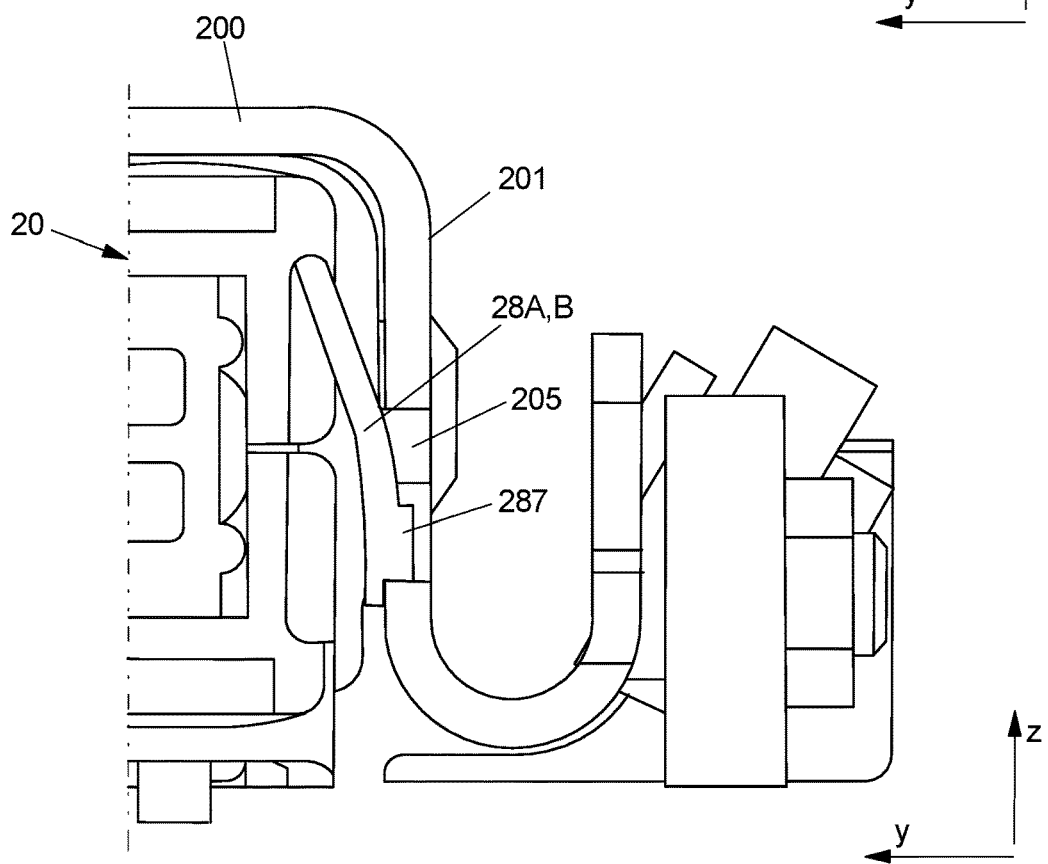
FIG. 16 shows a cross-sectional view of another exemplary embodiment of a supporting element.

In another embodiment, shown in FIG. 16, the engagement protrusions 287 may also be configured to provide support both upwardly and downwardly. For this purpose, the engagement protrusions 287 can each have a downwardly facing contact surface extending transversely to the vertical direction Z for supporting interaction with a lower edge of the assigned support opening 205 and an upwardly facing contact surface which extends transversely to the vertical direction Z for support on an upper edge of the assigned support opening 205.

As can be seen from FIGS. 14A, 14B, the engagement protrusions 287 of the supporting elements 28A, 28B, 28C also engage with play in the assigned support apertures 205 along the longitudinal direction X. Along the longitudinal direction X, axial support of the mechanism housing 224 is provided (solely) via the retaining elements 220, 221.

In the exemplary embodiments shown in FIGS. 10 to 16, the supporting elements 28A, 28B, 28C are shaped as tabs in the form of snap-action hooks on the mechanism housing 224. Alternatively, the supporting elements 28A, 28B, 28C may be shaped as pins, which may be separate elements to be connected to the mechanism housing 224, for example by insertion, by a bayonet connection or by another form-fit connection.

The idea underlying the solution is not limited to the exemplary embodiments described above, but can also be realized in other ways.

A vehicle subassembly to be adjusted via the adjustment device can be configured as a vehicle seat or, for example, a console element that is to be adjusted longitudinally in a vehicle interior.

Such a vehicle subassembly can be displaceably mounted via a guide rail and an associated adjustment assembly or also via two or possibly more pairs, each comprising a guide rail and an associated adjustment assembly.

LIST OF REFERENCE CHARACTERS 1 vehicle subassembly (vehicle seat)
10 seat part
11 backrest part
12 height adjustment device
120 kinematic parts
2 longitudinal adjustment device
20 adjustment assembly (adjustment rail)
200 base
201, 202 rail leg
203, 204 receiving opening
205 support opening
21 guide rail
210 base
211, 212 leg
22 adjustment mechanism
220, 221 retaining element
222, 223 opening
224 mechanism housing
225 edge
226-229 housing part
23 spindle
230, 231 fastening element
24 spindle nut
25 drive element (drive screw)
26 drive shaft
27 drive motor
28 supporting element
28A, B, C supporting element
280, 281 leg
282 contact portion
283 base portion
284A, B engagement protrusion
285A, B engagement protrusion
286 end
287 protrusion
288 run-on bevel
3 floor assembly
X longitudinal direction
Y transverse direction
Z vertical direction
Z1 bearing travel

The invention claimed is:

1. An adjustment device for a vehicle subassembly, comprising:
    a guide rail which extends along a longitudinal direction,
    an adjustment assembly which is guided on the guide rail so as to be displaceable along the longitudinal direction and which is assigned to the vehicle subassembly, the adjustment assembly being formed by an adjustment rail comprising a base and two rail legs arranged on the base,
    a spindle which is arranged on the guide rail,
    an adjustment mechanism which is operatively connected to the spindle, is arranged on the adjustment assembly, comprises a mechanism housing and is able to be driven so that the adjustment mechanism can be displaced, together with the adjustment assembly, along the longitudinal direction relative to the guide rail, and
    two separate retaining elements arranged on the adjustment assembly, each retaining element comprising an opening which is delimited by an edge and through which the spindle extends,
    wherein the retaining elements support the mechanism housing on the adjustment assembly in a floating manner in such a way that the mechanism housing together with the spindle, is movable with respect to the retaining elements via a bearing travel along a direction perpendicular to the longitudinal direction and pointing perpendicularly away from the base of the adjustment rail,
    wherein the retaining elements are spaced apart from one another along the longitudinal direction and receive between them the mechanism housing,
    wherein the adjustment device comprises a supporting element which is configured to limit the bearing travel of the mechanism housing in said direction perpendicular to the longitudinal direction in such a way that the spindle is prevented from butting against the edge of the opening of each retaining element along the direction perpendicular to the longitudinal direction and pointing perpendicularly away from the base of the adjustment rail.

2. The adjustment device according to claim 1, wherein the supporting element is configured to support the mechanism housing relative to the adjustment assembly.

3. The adjustment device according to claim 1, wherein the supporting element is arranged on the adjustment assembly.

4. The adjustment device according to claim 3, wherein the supporting element is supported on the retaining elements.

5. The adjustment device according to claim 1, wherein the supporting element is arranged on the mechanism housing.

6. The adjustment device according to claim 5, wherein the supporting element is formed in one piece with a housing portion of the mechanism housing.

7. The adjustment device according to claim 6, wherein the supporting element is formed as a tab which extends from the housing portion.

8. The adjustment device according to claim 1, wherein the supporting element is elastically resilient at least in portions.

9. The adjustment device according to claim 1, wherein the supporting element can be detachably mounted on the adjustment assembly.

10. The adjustment device according to claim 1, wherein the supporting element is configured to support the mechanism housing relative to the guide rail.

11. The adjustment device according to claim 10, wherein the supporting element is arranged on the mechanism housing.

12. The adjustment device according to claim 10, wherein the supporting element is formed in one piece with the mechanism housing.

13. The adjustment device according to claim 1, wherein the supporting element is arranged on at least one of the rail legs and is configured to provide support for the mechanism housing to limit the bearing travel along the direction perpendicular to the longitudinal direction and pointing perpendicularly away from the base of the adjustment rail.

14. The adjustment device according to claim 1, wherein the supporting element is arranged on the mechanism housing and is configured to provide support of the mechanism housing on at least one of the rail legs to limit the bearing travel along the direction perpendicular to the longitudinal direction and pointing perpendicularly away from the base of the adjustment rail.

15. The adjustment device according to claim 1, wherein the retaining elements are fixedly arranged between the rail legs.

16. The adjustment device according to claim 1, wherein each retaining element forms a flat plate portion which extends transversely to the longitudinal direction.

17. The adjustment device according to claim 1, comprising two retaining elements which are spaced apart from one another along the longitudinal direction and receive between them the mechanism housing.

18. The adjustment device according to claim 1, wherein the mechanism housing can be mounted on the retaining elements along the direction perpendicular to the longitudinal direction and pointing perpendicularly away from the base of the adjustment rail in a state in which if the retaining elements are already mounted on the adjustment assembly.

* * * * *